US008768803B2

(12) United States Patent
DeWanz et al.

(10) Patent No.: US 8,768,803 B2
(45) Date of Patent: Jul. 1, 2014

(54) SYSTEM AND METHOD FOR IDENTIFYING SUSPICIOUS FINANCIAL RELATED ACTIVITY

(75) Inventors: Deborah M. DeWanz, Woodbury, MN (US); Susan Mary Fleege, St. Paul Park, MN (US); Shannon M. Kohout, Woodbury, MN (US); Sheila L. Sommers, Hudson, WI (US)

(73) Assignee: Hartford Fire Insurance Company, Hartford, CT (US)

( * ) Notice: Subject to any disclaimer, the term of this patent is extended or adjusted under 35 U.S.C. 154(b) by 158 days.

(21) Appl. No.: 12/965,138

(22) Filed: Dec. 10, 2010

(65) Prior Publication Data
US 2012/0150708 A1 Jun. 14, 2012

(51) Int. Cl.
*G06Q 40/00* (2012.01)
(52) U.S. Cl.
USPC .......................................................... 705/35
(58) Field of Classification Search
USPC ....................................... 705/35, 36 R, 38, 30
See application file for complete search history.

(56) References Cited

U.S. PATENT DOCUMENTS

| | | | |
|---|---|---|---|
| 2002/0077940 A1* | 6/2002 | Riley | 705/30 |
| 2003/0033228 A1 | 2/2003 | Bosworth-Davies et al. | |
| 2003/0177087 A1 | 9/2003 | Lawrence | |
| 2005/0138109 A1* | 6/2005 | Redlich et al. | 709/201 |
| 2007/0100744 A1 | 5/2007 | Wu et al. | |
| 2008/0183618 A1* | 7/2008 | Giacco et al. | 705/40 |

* cited by examiner

*Primary Examiner* — Ojo Oyebisi
(74) *Attorney, Agent, or Firm* — Howard IP Law Group, PC

(57) ABSTRACT

A computer system detects questionable financial transactions. The system includes a data source component configured to access a database of transaction data, and a data storage component configured to store transaction data that is to be reviewed. An account compilation component of the system is configured to compile data sets from the transaction data. Each data set includes pertinent external transactions in the transaction data that are related to a particular individual client during a screening time interval. The account compilation component excludes internal transactions from the data sets. A screening component is configured to compare each data set with at least one screening criterion. A reporting component is configured to report data sets that satisfy the at least one screening criterion.

14 Claims, 7 Drawing Sheets

SYSTEM AND METHOD FOR IDENTIFYING SUSPICIOUS FINANCIAL RELATED ACTIVITY

FIELD

The present invention relates to computer systems, and particularly to computer systems for administering financial products.

BACKGROUND

Financial institutions (FIs) are generally subject to regulations that require FIs to monitor their customers' financial transactions for the purpose of detecting and reporting transactions that may be related to money laundering or other illegal activity. The large number of transactions that take place at a major FI precludes 100% review by FI employees. Accordingly, it has been proposed to provide computer systems that automatically screen all transactions and flag potentially suspicious transactions for review by a human transaction analyst. As is the case with any machine screening system, there is a potential conflict between two objectives—flagging all suspicious transactions, and avoiding "false positives".

SUMMARY

An apparatus, method, computer system and computer-readable data storage medium are disclosed which detect questionable financial transactions, including a data source that is configured to access a database of transaction data, and a data storage component that is coupled to the data source and configured to store the transaction data.

The apparatus, method, computer system and computer-readable data storage medium further include an account compilation component that is coupled to the data storage component. The account compilation component is configured to compile data sets from the transaction data. Each of the data sets includes all pertinent external transactions in the transaction data that are related to a particular individual client during a screening time interval. The account compilation component excludes internal transactions from the data set.

The apparatus, method, computer system and computer-readable data storage medium further include a screening component that is coupled to the account compilation component. The screening component is configured to compare each of the data sets with one or more screening criteria.

The apparatus, method, computer system and computer-readable data storage medium further include a reporting component that is coupled to the screening component. The reporting component is configured to report data sets that satisfy the screening criteria applied by the screening component.

The screening criteria may be set to provide a satisfactory balance between detecting most or all questionable transactions, while not gathering an excessive number of transactions for review by a human transaction analyst. Compiling transactions from the account level to the individual client level helps to assure that suspicious patterns of activity will be flagged.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purpose of introducing concepts of embodiments of the present invention, a transaction monitoring system aggregates transactions for individual clients across the various accounts owned by the individual clients. Screening criteria are applied to the aggregated transactions for each client to detect unusual patterns of activity in the client's accounts. For example, in a mutual fund environment, a satisfactory set of screening criteria may operate to flag clients/accounts which aggregate three or more withdrawal transactions totaling $50,000 or more over a twelve month period. Accounts/clients which satisfy the screening criteria may be flagged for review by a human transaction analyst.

Figure 1:
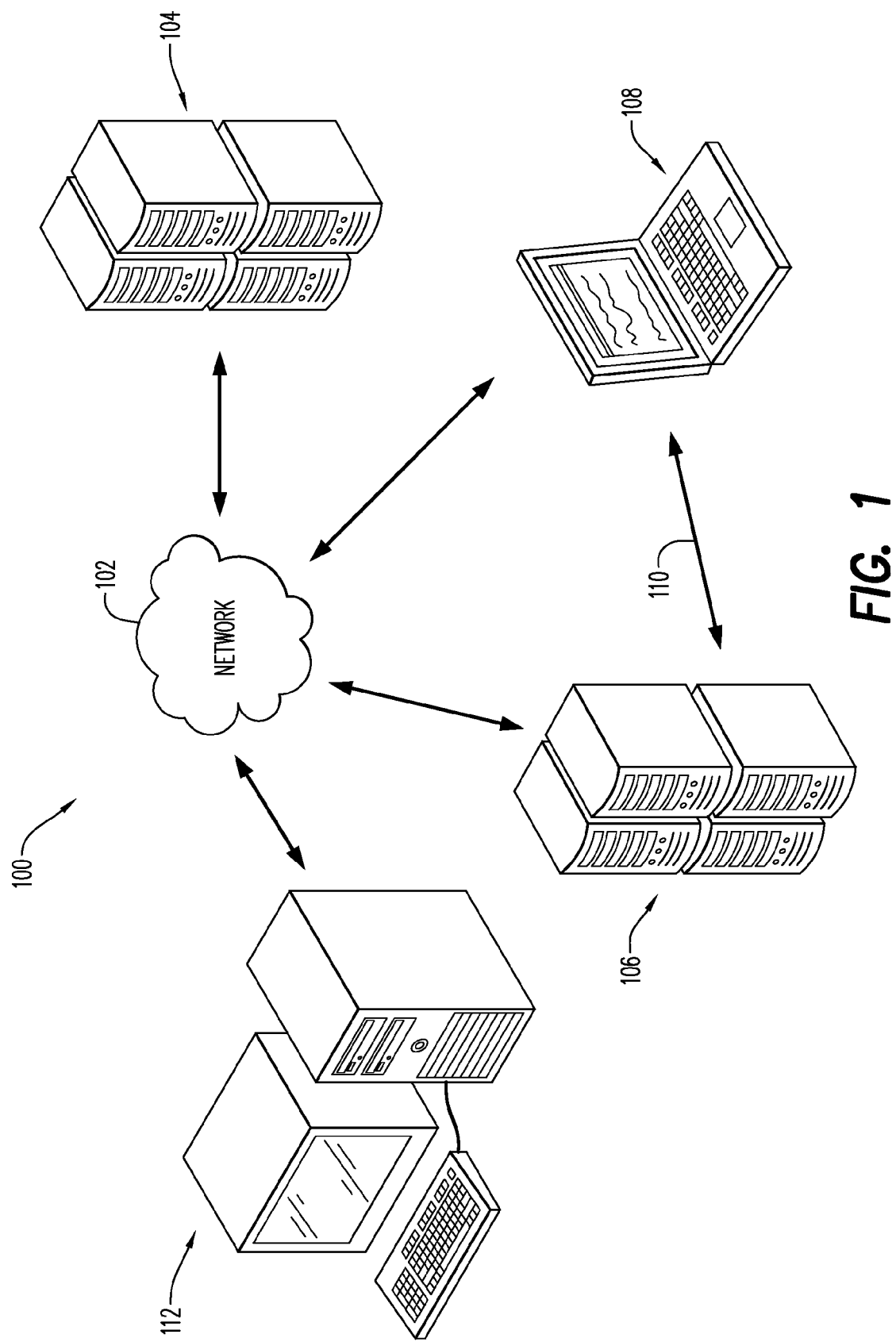
FIG. 1 is a block diagram that illustrates a computer system in which the present invention is applied.

FIG. 1 is a block diagram that illustrates a computer system 100 in which the present invention is applied. At least a portion of the computer system 100 may be operated by a financial institution, such as an insurance company, that operates mutual funds or other investment vehicles.

The computer system 100 may include a conventional data communication network 102. The data communication network 102 may, for example, be a combination of one or more private data networks with one or more public data networks such as the Internet.

Further, the computer system 100 may include an account administration server computer 104 that is operated by or on behalf the financial institution. The account administration server computer 104 is coupled to the data communication network 102, and may operate in a conventional manner to handle transactions (such as deposits and withdrawals) and manage records relating to mutual fund accounts and/or other financial accounts issued by the financial institution. The account administration server computer 104 may, for example, include a database system (not separately shown) in which transaction data is stored. In addition or alternatively, at least some transaction data may be maintained in a separate data warehouse (not shown) which is accessible by the account administration server computer 104.

The computer system 100 may also include a transaction monitoring server computer 106. The transaction monitoring server computer 106 is also operated by or on behalf of the financial institution and is coupled to the data communication network 102. The transaction monitoring server computer 106 may monitor transactions handled by the account administration server computer 104 and for that purpose may receive and screen transaction data that originates from the account administration server computer 104.

Results of the monitoring operations performed by the transaction monitoring server computer 106 may be downloaded to a personal computer 108, which is operated by a transaction analyst employee of the financial institution. The computer 108 may hereinafter be referred to as a "transaction analyst computer", and may also be considered to be part of the computer system 100. Although communication between the transaction monitoring server computer 106 and the transaction analyst computer 108 is represented as being direct (at 110), in practice such communication may be via the data communication network 102 and for that purpose the transaction analyst computer 108 may be coupled to the data communication network 102. Although only one transaction analyst computer 108 is shown in the drawing, in practice the computer system 100 may include a number of such computers.

In some embodiments, all of the hardware aspects of the computer system 100 are conventional, but the account administration server computer 104, the transaction monitoring server computer 106 and the transaction analyst computer 108 may be programmed and operated, such that the computer system 100 functions in accordance with principles of the present invention, as discussed below. The computer system 100 may also include other components that are not depicted in the drawing, and may perform functions in addition to those explicitly described herein.

FIG. 1 also shows a computer 112 that may be operated by a client/account holder and that may engage in data communications from time to time with one or more computers operated by the financial institution. The account holder computer 112 may, for example, be located at the account holder's home or office.

Figure 2:
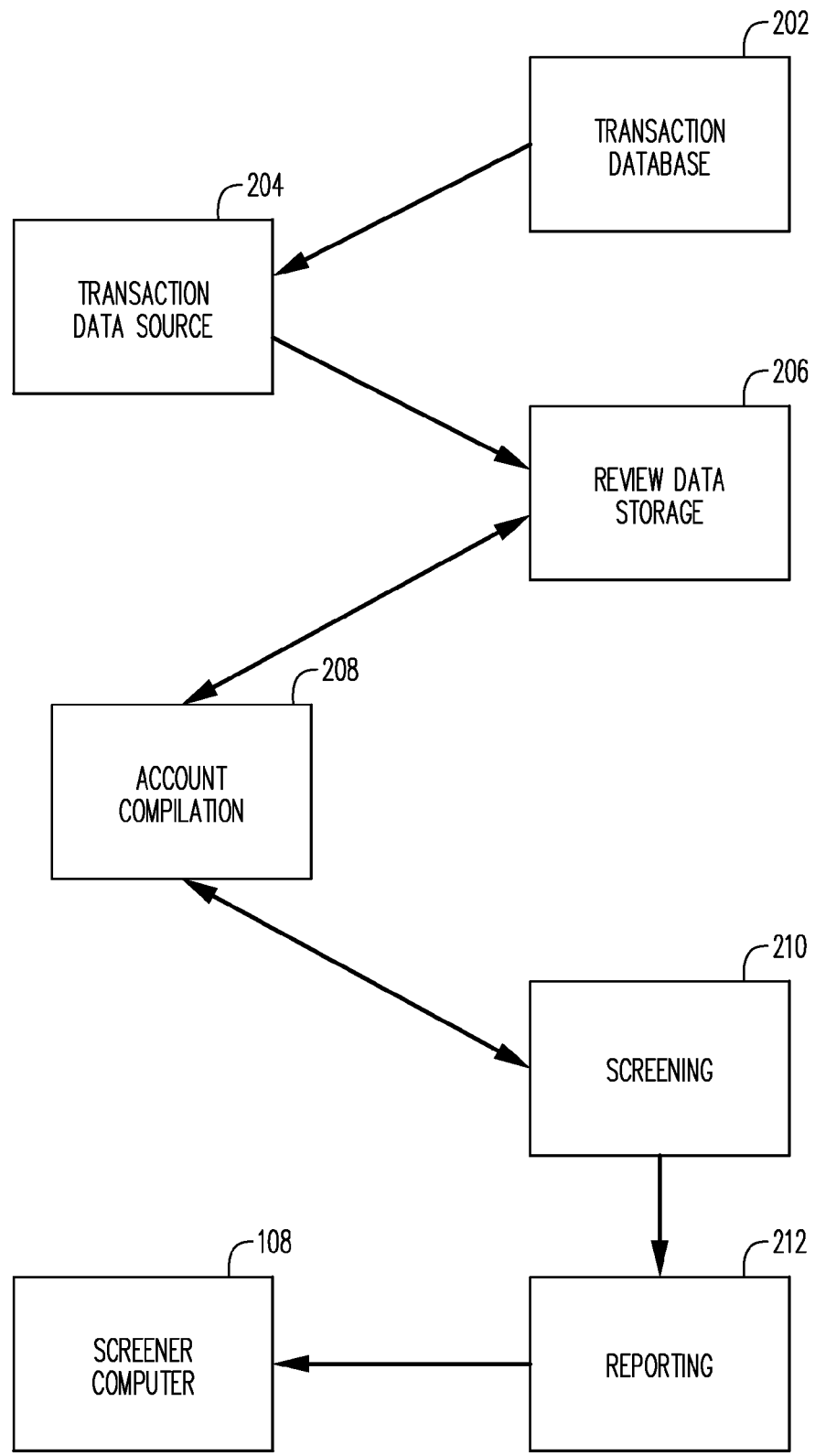
FIG. 2 is a block diagram that illustrates transaction monitoring functionality provided in accordance with aspects of the present invention in the computer system of FIG. 1.

FIG. 2 is a block diagram that illustrates transaction monitoring functionality provided in accordance with aspects of the present invention in the computer system 100. Much of the functionality illustrated in FIG. 2 may be implemented with the transaction monitoring server computer 106.

Block 202 in FIG. 2 represents a transaction database that may be part of or accessible by the account administration server computer 104. The transaction database 202 may store data that reflects transactions such as deposits, withdrawals, transfers, dividend payments, capital gains, etc. relating to mutual fund accounts and/or other financial accounts issued by the financial institution. In some embodiments, the transaction database 202 and/or the account administration server computer 104 may be operated and/or owned by a financial processing services contractor (e.g., a transfer agent) retained by the financial institution.

Block 204 represents a transaction data source component, which may receive and/or extract transaction data from the transaction database 202 and store the transaction data in a data storage component 206 which stores transaction data that is to be screened in accordance with aspects of the present invention. In some embodiments, the transaction data source component 204 receives at least some data with respect to every transaction handled by the account administration server computer 104. In other embodiments, the transaction data source component 204 receives data relating only to certain kinds of transactions, and excludes data for other types of transactions. In such cases, the transaction data source component 204 may be considered to be performing a transaction exclusion function that may also be attributed to the account compilation component 208 that will now be discussed. Thus the transaction data source component 204 and the account compilation component 208 may be considered to be at least partly integrated with each other.

The account compilation component 208 may process the transaction data stored in the data storage component 206 for the purpose of aggregating/compiling—across financial accounts—all transactions that relate to each individual client of the financial institution. Details of operation of an example embodiment of the account compilation component 208 are discussed below in connection with FIG. 5.

Block 210 in FIG. 2 represents a screening component 210. The screening component 210 processes the aggregated transaction data produced by the account compilation component 208 to determine whether a transaction/account/client should be flagged for further scrutiny. The screening component 210 may make this determination based on rules/screening criteria, of which examples are discussed below in connection with FIG. 6.

Transactions/accounts/clients that are flagged by the screening component 210 may be passed from the screening component 210 to a reporting component 212. The reporting component 212, in turn, may format or package the flagged transactions/accounts/clients in a suitable manner to allow for access by the transaction analyst computer 108 (which may also be referred to as a "screener computer").

Figure 3:
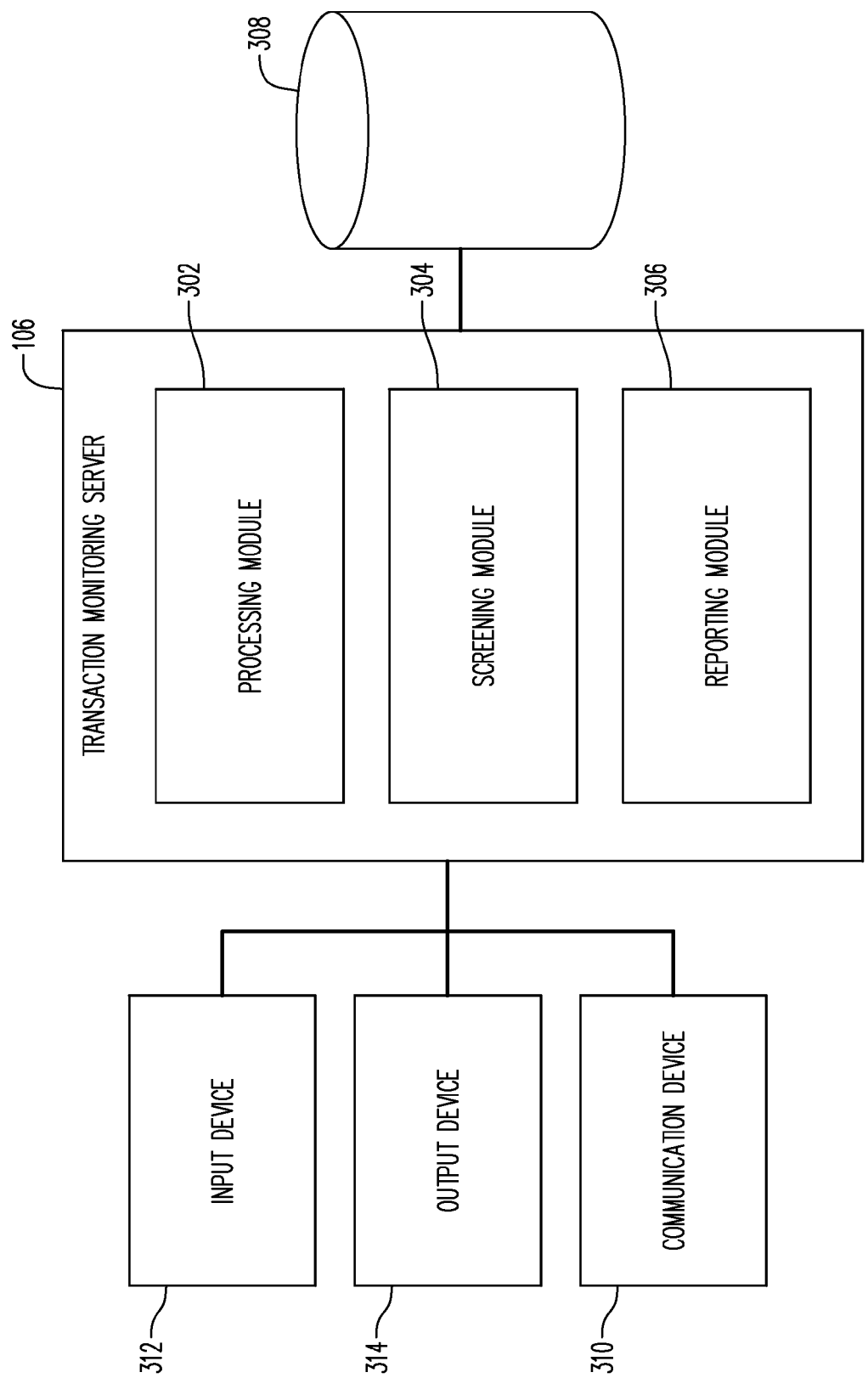
FIG. 3 is a block diagram that illustrates a server computer that may provide the functionality of FIG. 2 in the computer system of FIG. 1.

FIG. 3 is a block diagram representation of the transaction monitoring server computer 106 shown in FIG. 1. The transaction monitoring server computer 106 may be conventional in terms of its hardware aspects.

As depicted in FIG. 3, the transaction monitoring server computer 106 includes a processing module 302, which may be constituted by one or more conventional computer processors. The transaction monitoring server computer 106 further includes a screening module 304. The screening module 304 may, for example, implement some or all of the functionality represented by blocks 204, 208 and 210 in FIG. 2. The screening module 304 may be constituted, at least in part, by the processing module 302 in combination with suitable software program instructions. Aspects of the software program instructions for the screening module 304 will be described below.

The transaction monitoring server computer 106 further includes a reporting module 306, which may correspond to the reporting component 212 shown in FIG. 2. The reporting module 306 may also be constituted, at least in part, by the processing module 302 in combination with suitable program instructions. Aspects of the software program instructions for the reporting module 306 will also be described below.

The transaction monitoring server computer 106 further includes one or more storage devices, represented by item 308 in FIG. 3. The storage devices 308 may, for example, implement the data storage component 206 shown in FIG. 2. The storage devices 308 are coupled for data communication with the processing module 302 and may comprise any appropriate information storage device, including combinations of magnetic storage devices (e.g., magnetic tape and hard disk drives), optical storage devices, and/or semiconductor memory devices (such as Random Access Memory (RAM) devices and Read Only Memory (ROM) devices). At least some of these devices may be considered computer-readable storage media, or may include such media. The storage devices 308 may store the above-mentioned software program instructions and/or other program instructions to control the processing module 302 such that the transaction monitoring server computer 106 provides desired functionality, as described herein. Thus, the storage devices 308 store one or more programs for controlling the processing module 302. The processing module 302 performs instructions of the programs, and thereby operates in accordance with aspects of the present invention. In some embodiments, the programs may include one or more conventional operating systems. The programs may further include application programs such as a conventional data communication program and a conventional database management program. Aspects of the application programs will be described below. Still further, the storage devices 308 may store one or more databases for storing the transaction data that was extracted/received for monitoring from the transaction database 202 (FIG. 2).

Continuing to refer to FIG. 3, the transaction monitoring server computer 106 may further include one or more communication devices 310 coupled to the processing module 302. The communication devices 310 may function to facilitate communication with, for example, other devices (such as the account administration server computer 104 and/or the transaction analyst computer 108 shown in FIG. 1). In addition, the transaction monitoring server computer 106 may include one or more input devices 312 such as a keyboard, a keypad, a mouse or other pointing device, a microphone, knob or a switch, an infra-red (IR) port, a docking station and/or a touch screen. The input device(s) 312 may be coupled to the processing module 302. Still further the transaction monitoring server computer 106 may include one or more output devices 314, such as a display (e.g., a display screen), a speaker, and/or a printer. The output devices 314 may also be coupled to the processing module 302.

Figure 4:
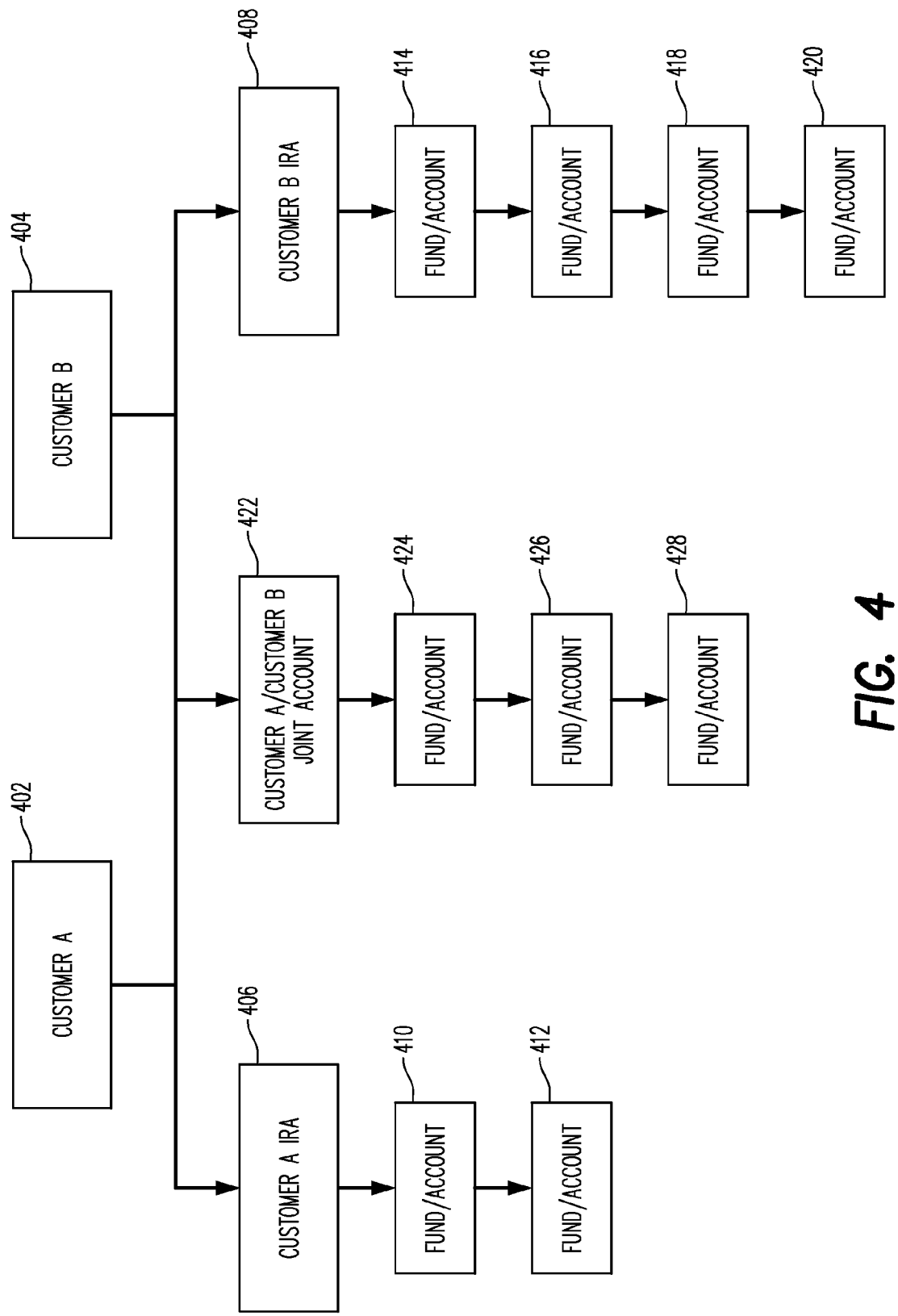
FIG. 4 is a diagram that illustrates an example of an account structure for two related individual customers of a financial institution (FI) that operates the computer system of FIG. 1.

FIG. 4 is a diagram that illustrates an example of an account structure for two related individual customers (e.g., spouses, schematically represented by blocks 402 and 404) of a financial institution. It is assumed for this example that each of the customers 402, 404 has his or her own IRA (individual retirement account), represented by block 406 for customer A and by block 408 for customer B. Within customer A's IRA 406 there are two separate fund account holdings (blocks 410 and 412); within customer B's IRA 408 there are four separate fund account holdings (blocks 414, 416, 418 and 420).

FIG. 4 also indicates that customers A and B also share a joint account 422. The joint account 422 includes three separate fund account holdings 424, 426 and 428.

In some embodiments, customer A's Social Security number is associated with accounts 406, 410, 412, 422, 424, 426 and 428; and customer B's Social Security number is associated with accounts 408, 414, 416, 418, 420, 422, 424, 426 and 428. In some embodiments, a customer's Social Security number may also be associated with any account held by another customer with whom the first customer shares a joint account.

Figure 5:
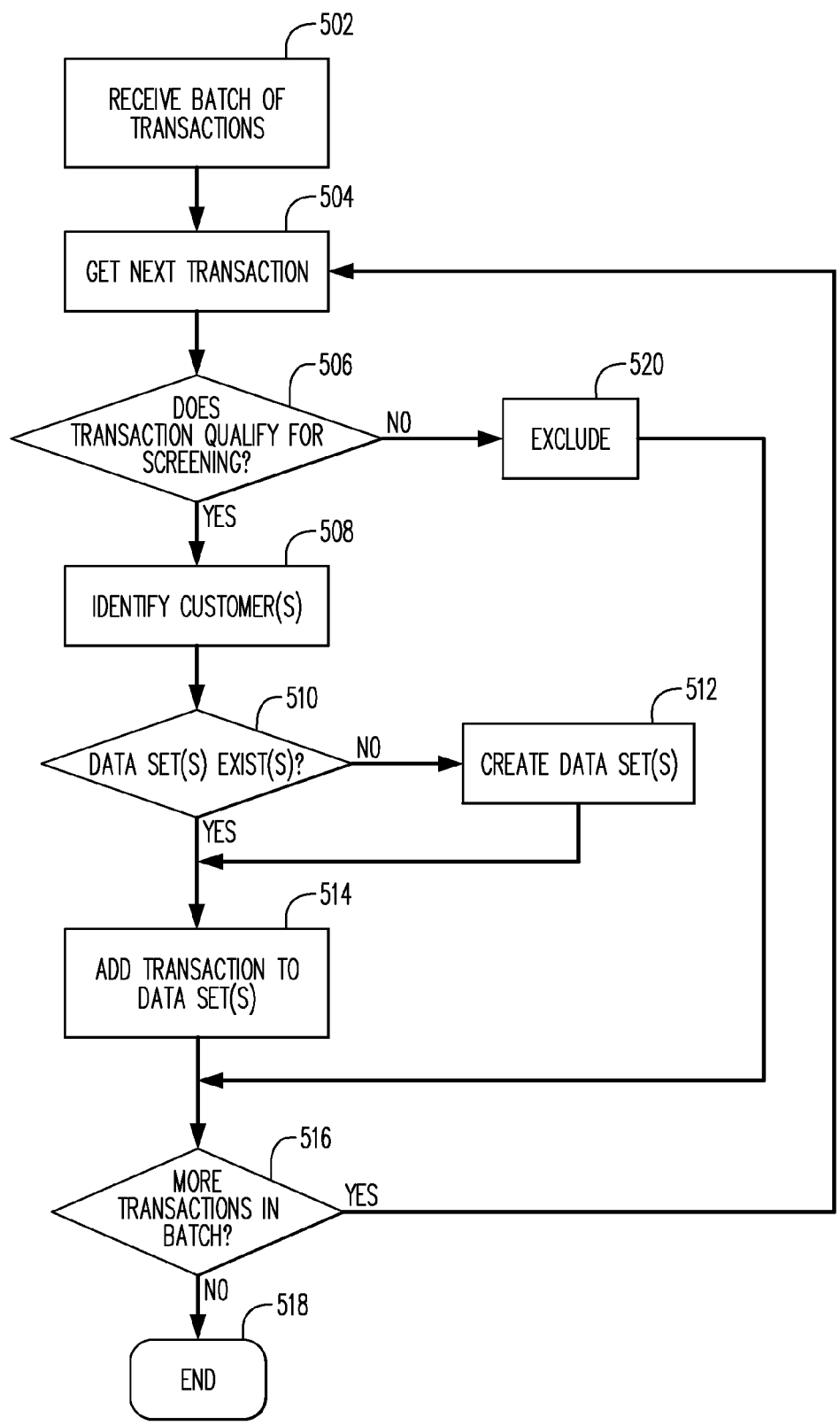
FIGS. 5 and 6 are flow charts that illustrate processes that may be performed in accordance with aspects of the invention by the server computer of FIG. 3.

FIG. 5 is a flow chart that illustrates a process that may be performed by the transaction monitoring server computer 106 in accordance with aspects of the present invention. The process illustrated in FIG. 5 may relate to aggregating transactions for a given individual client of the financial institution across all accounts wholly or partially owned by the individual client. The process may be performed, for example, by the screening module 304 shown in FIG. 3 and/or the transaction data source component 204 (FIG. 2) and/or the account compilation component 208 (also shown in FIG. 2).

At 502 in FIG. 5, the transaction monitoring server computer 106 receives a batch of transaction data that is to be screened by the transaction monitoring server computer 106. At 504, the transaction monitoring server computer 106 accesses the next or first transaction in the batch of transaction data. Then, decision block 506 follows block 504. At decision block 506, the transaction monitoring server computer 106 determines whether the current transaction qualifies for screening. That is, the transaction monitoring server computer 106 may operate such that transactions not deemed likely to present money laundering issues may be excluded from screening. In some embodiments, the categories of transactions to be excluded from screening may be: (a) transfers between accounts issued by the financial institution (hereinafter, "internal" transactions); (b) redemption/withdrawal transactions that occur pursuant to a regular, predetermined schedule of withdrawals ("systematic redemption" transactions); (c) transactions to or from accounts that are used by dealers; (d) dividend transactions; (e) capital gain transactions; and (f) redemption transactions due to the death of the client. In some embodiments, only withdrawal/redemption transactions, and not deposit/investment transactions, are subject to screening. In some embodiments, omnibus accounts also may be excluded from screening, or may be subjected to screening by a separate procedure from that described herein in connection with FIGS. 5 and 6. As is understood by those who are skilled in the art, an "omnibus" account is an account that is controlled by a nominee or fiduciary and that contains assets held for the benefit of a number of different individual beneficiaries.

If, for the current transaction, a positive determination is made at decision block 506 (i.e., if it is determined that the current transaction qualifies for screening), then the process of FIG. 5 may advance from decision block 506 to block 508. At block 508, the transaction monitoring server computer 106 identifies each customer that is associated with the transaction (i.e., associated with the account in which the transaction occurred). This may be done, for example, based on the Social Security number(s) associated with the account. The process then advances from block 508 to decision block 510. At block 510, and for each customer identified for the current transaction at block 508, the transaction monitoring server computer 106 determines whether there currently exists a data set in which the transaction monitoring server computer 106 is aggregating transactions applicable to the customer. If not, then the process of FIG. 5 advances from decision block 510 to block 512. At block 512, the transaction monitoring server computer 106 generates a transaction aggregation data set for the customer in question, and the process then advances from block 512 to block 514. Alternatively, if at decision block 510 it is determined that a transaction aggregation data set already exists for each customer identified at block 508, then the process of FIG. 5 advances directly from decision block 510 to block 514.

At block 514, the current transaction is added to the data set for each of the customers identified at block 508. The process then advances from block 514 to decision block 516. At decision block 516, the transaction monitoring server computer 106 determines whether there are other transactions in the batch that remain to be assigned (if qualified for screening) to transaction aggregation data sets. If so, then the process loops back from decision block 516 to block 504, and the next transaction in the batch is accessed and considered. If not, then the process ends (block 518).

Considering again decision block 506, if a negative determination is made at that decision block (i.e., if it is determined that the current transaction accessed at block 504 is not qualified for screening), then block 520 follows decision block 506. At block 520, the current transaction is excluded from being aggregated with other transactions for the relevant customer(s) and is excluded from screening. The process then advances from block 520 to decision block 516.

The result of the process of FIG. 5 is that each transaction in the batch that is qualified for screening is added to a transaction aggregation data set for each individual client who is associated with the transaction in question.

Figure 6:
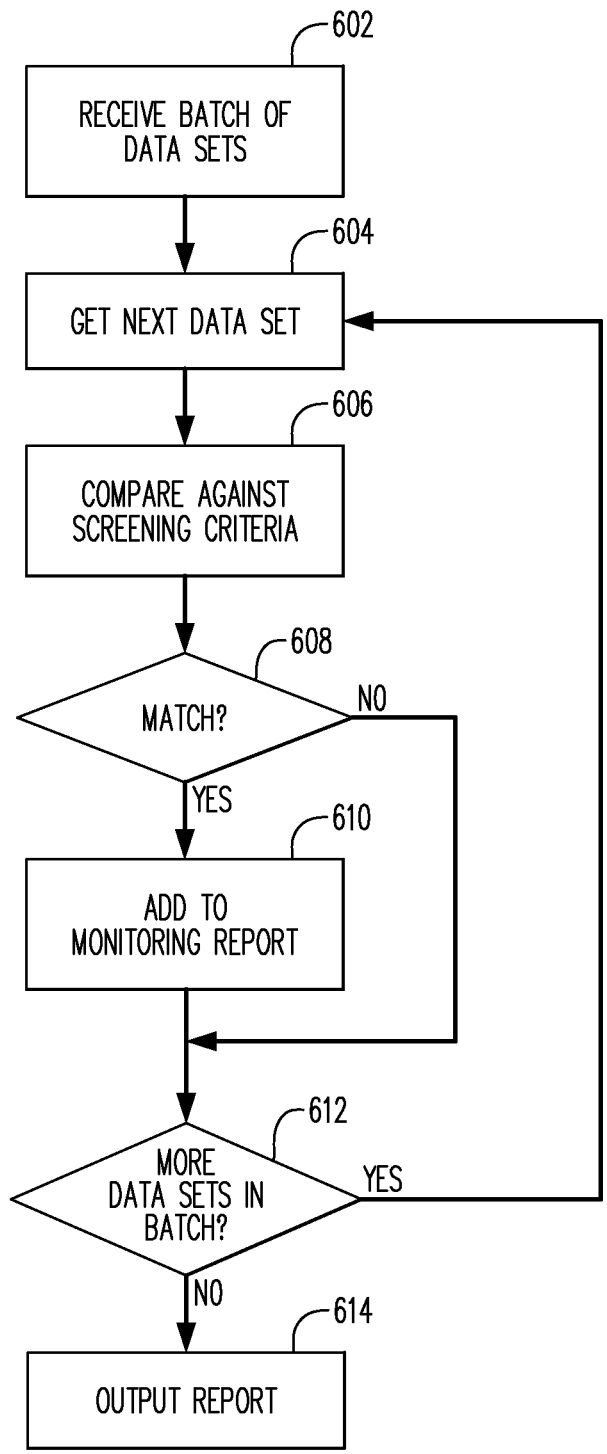

FIG. 6 is a flow chart that illustrates another process that may be performed in accordance with aspects of the present invention by the transaction monitoring server computer 106. For example, most or all of the process of FIG. 6 may be performed by the screening module 304 shown in FIG. 3 and/or the screening component 210 shown in FIG. 2. A final step or steps in the process may be performed by the reporting module 306 shown in FIG. 3 and/or the reporting component 212 shown in FIG. 2.

At 602 in FIG. 6, the screening component 210 receives a batch of data sets from the account compilation component 208. For example, in some embodiments, the batch of data sets may represent all existing data sets for which a transaction was added for aggregation during the last processing cycle by the transaction monitoring server computer 106. At 604, the screening component 210 accesses the next or first data set in the batch of data sets. Then, at 606, the transaction data in the data set is compared with one or more screening criteria. For example, the financial institution may have determined that, for the vast majority of legitimate accounts, normal activity by an individual client consists of less than a certain monetary amount (say $50,000; $100,000 or $250,000) in withdrawals per twelve month period, and that when large withdrawals (i.e., more than the monetary amount) occur in a twelve month period, legitimate activity generally requires no more than a certain number of withdrawals (say two, three or four or another number of withdrawals). Accordingly, in one embodiment, the screening criteria may call for flagging an individual client/transaction/account for further scrutiny if and only if both of the following are satisfied for a given individual client during a twelve month screening period: (a) more than a certain number of withdrawals; and (b) withdrawals aggregating more than a certain monetary amount. In some embodiments, changing conditions and/or updated awareness of potential wrongdoing, may result in the financial institutions modifying one or more of the screening criteria (e.g., raising or lowering an aggregate monetary amount which triggers further review).

Decision block 608 follows block 606. At decision block 608, it is determined whether the data set that is currently being reviewed matches the screening criteria. If so, then block 610 follows decision block 608. At block 610, the data set currently being reviewed is added to a monitoring report. This may involve appending the data set itself, and/or the relevant transactions, and/or the relevant account or accounts, and/or the identification of the relevant individual client, to the monitoring report.

Decision block 612 follows block 610. At decision block 612 it is determined whether there are more data sets to be reviewed in the batch of data sets received at 602. If so, then the process of FIG. 6 loops back from decision block 612 to block 604 and the next data set is accessed. However, if at decision block 612 it is determined that there are no more data sets to review, then the process of FIG. 6 advances from decision block 612 to block 614.

At block 614, the transaction monitoring server computer 106 (i.e., the reporting module 306/reporting component 212) outputs to a human transaction analyst a report on all of the data sets/accounts/customers flagged for further scrutiny as a result of the process of FIG. 6. For example, the report may be printed out on a printer/output device 314 (FIG. 3), and/or the report may be sent by email to the transaction analyst computer 108 (FIGS. 1 and 2).

Referring again to FIG. 6, and particularly to decision block 608, if it is determined at decision block 608 that the data set currently being reviewed (i.e., the data set accessed at 604) does not match the screening criteria, then the process advances directly from decision block 608 to decision block 612, bypassing block 610 and therefore leaving the current data set out of the monitoring report.

Figure 7:
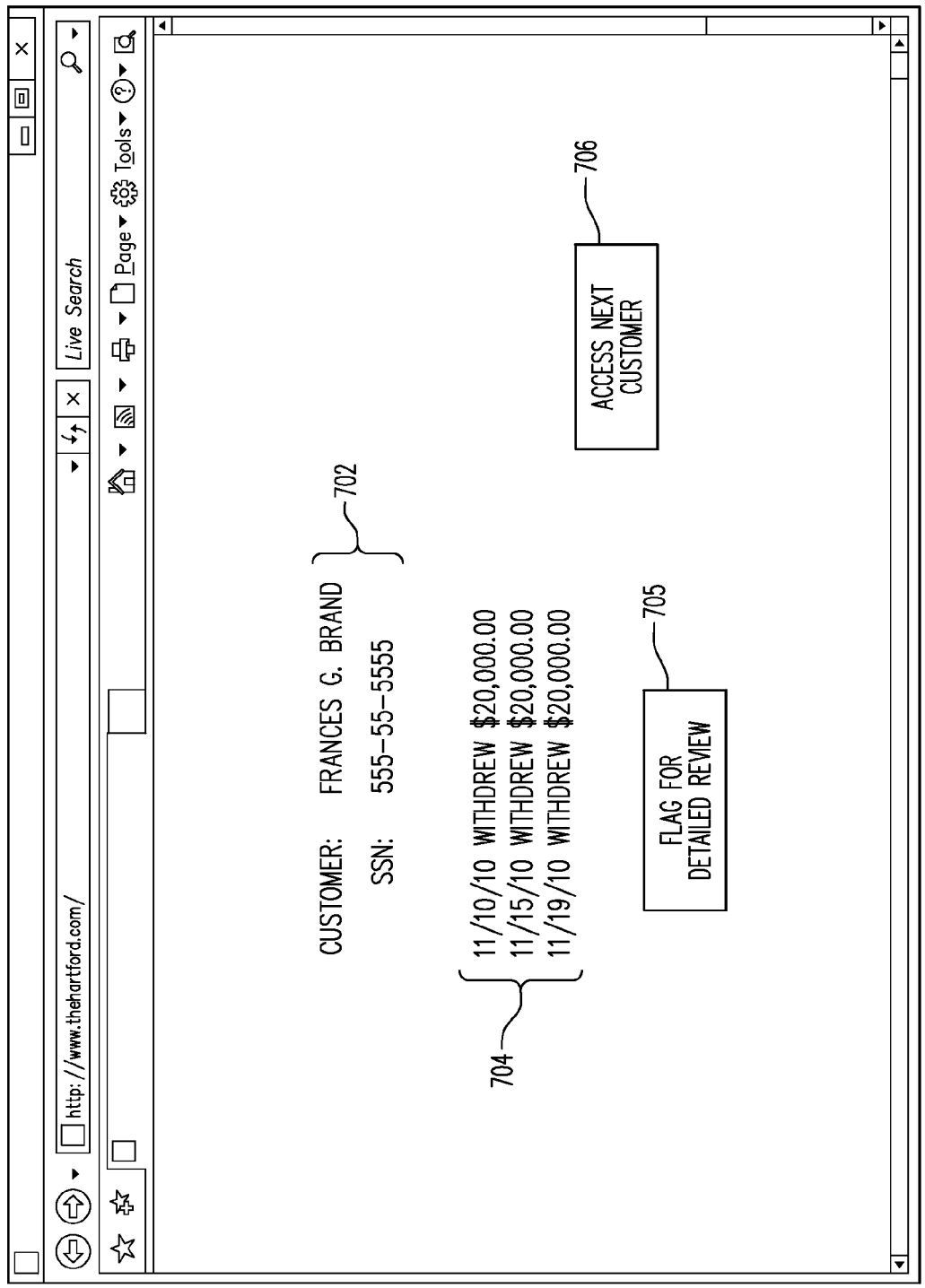
FIG. 7 is a screen display that may be presented in the system of FIG. 1 in connection with the process of FIG. 6.

FIG. 7 is a screen display that may be presented on a display component of the transaction analyst computer 108 when a transaction analyst accesses the monitoring report that was generated by the process of FIG. 6. In particular, the FIG. 7 screen display may reflect access to a single data set included in the monitoring report.

At 702 in FIG. 7, customer identifying information is provided. Transaction information for the transactions included in the data set and matching the screening criteria is provided at 704. A button 705 allows the transaction analyst to flag the customer/data set for detailed review. A button 706 allows the transaction analyst to move on to the next data set/customer that is listed in the monitoring report.

In some embodiments, other or additional information may be provided in the screen display.

In some embodiments, instead of or in addition to accumulating all flagged data sets from a batch in a report, the transaction monitoring server computer 106 may send out alerts about each flagged data set, or limited numbers of data sets, as the same are detected.

In some embodiments, there may be different screening protocols and/or different screening criteria applied to different categories of accounts. For example, omnibus accounts and/or high value accounts may be subjected to different screening criteria than other accounts. For example, if aggregate monetary amounts and/or a single transaction monetary amount is employed as a screening criterion, a higher monetary amount screening criterion may be applied to screen omnibus and/or high value accounts than other accounts. A "high value" account may be an account that holds more than a certain amount (say $1,000,000 or $2,000,000).

For screening omnibus accounts, high value accounts and/or other accounts (such as most accounts issued by the financial institution) other screening criteria may be employed besides those previously described herein. For example, instead of or in addition to using a fixed monetary amount as a screening criterion, a monetary amount calculated as a percentage of (a) the current value of a respective account and/or (b) a recent additional investment in the respective account, may be used as a screening criterion. As one example, withdrawal of 80%, 70% or 60% of a purchased amount within 60 days after purchase may be employed in some cases as a screening criterion.

Another screening criterion that may also or alternatively be employed may relate to purchases in excess of a certain amount (e.g., $50,000 or $100,000) into a nonzero account that previously held less than another threshold amount (e.g., $5,000 or $10,000).

Other screening criteria may relate to "velocity"—i.e., the number or frequency of transactions or inter-account transfers within a limited period of time.

Although the computers 104 and 106 are depicted and described as separate computer resources in the above disclosure, it may alternatively be the case that the functions of those two computers may be combined in a single computer or computer system.

The process descriptions and flow charts contained herein should not be considered to imply a fixed order for performing process steps. Rather, process steps may be performed in any order that is practicable.

As an alternative to the set of screening criteria described herein, many other sets of screening criteria may be used, as appropriate to the operations of a particular financial institution. A screening interval other than a twelve-month period may be used. Instead of or in addition to "yes/no" screening criteria, the screening process may be rules-based and may generate a score for each data set and/or transaction to indicate the degree of likelihood that the data set/transaction is suspicious. The system may employ screening criteria other than, or in addition to: (a) transaction timing, (b) number of transactions and (c) amounts of transactions.

As used herein and in the appended claims, a "pertinent" transaction is one that qualifies for comparison with screening criteria according to one or more rules applied in a transaction monitoring server computer.

As used herein and in the appended claims, an "external" transaction is a withdrawal transaction that is not a transfer between two accounts related to the same individual client and held at the financial institution or its affiliates.

As used herein and in the appended claims, the term "computer" refers to a single computer or to two or more computers in communication with each other and/or operated by a single organization or by two or more organizations that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system for detecting questionable financial transactions by individual clients, the computer system comprising:
    a data source component configured to access a database of financial transaction data;
    a data storage component, coupled to the data source component, and configured to store the financial transaction data;
    an account compilation component, including a processor and coupled to the data storage component, and configured to:
        receive one or more financial transactions;
        compare each of the received financial transactions to a list of excluded internal transaction types, wherein the list includes systematic redemption transactions, dealer account transactions, omnibus account transactions, dividend transactions, capital gain transactions, and redemption transactions due to death of an account holder;
        determine for each of the financial transactions based on the comparison whether the financial transaction is an excluded internal transaction;
        responsive to a determination that the financial transaction is an excluded internal transaction, exclude the financial transaction from additional screening;
        responsive to a determination that the financial transaction is not an excluded internal transaction, add the financial transaction to a dataset for the individual client that performed the financial transaction, thereby compiling separate data sets for one or more of the individual clients from the financial transaction data, each data set comprising pertinent external financial transactions in the financial transaction data that are related to a respective individual client during a screening time interval;
    a screening component, including a processor and coupled to the account compilation component, and configured to
        compare, for each of the data sets, the external financial transactions for the respective individual client in the data set with at least one screening criterion, wherein said at least one screening criterion includes one of a criterion based on an aggregate monetary amount of all external financial transactions in a respective dataset, and an aggregate number of all external financial transactions within the screening time interval in the respective dataset;
        determine, based on the comparison, if the dataset for the respective individual client includes financial transactions that match the at least one screening criterion; and
        responsive to a determination that the dataset matches the at least one screening criterion, add the dataset to a monitoring report; and
    a reporting component, coupled to the screening component, and configured to report each data set for each respective individual client that satisfies the at least one screening criterion.

2. The computer system of claim 1, wherein at least some of said data sets each include a plurality of financial transactions, and said plurality of financial transactions collectively relate to a plurality of accounts related to the respective individual client for said each data set.

3. The computer system of claim 1, wherein said aggregate monetary amount is modified from time to time.

4. The computer system of claim 1, wherein the account compilation component excludes selected external financial transactions.

5. The computer system of claim 1, wherein said aggregate number of financial transactions is modified from time to time.

6. A method of operating a computer system, the method comprising:
    accessing a database of financial transaction data for one or more financial transactions from a data warehouse storage system;
    storing the financial transaction data in a screening system storage component;
    comparing each of the received financial transactions to a list of excluded internal transaction types, wherein the list includes systematic redemption transactions, dealer account transactions, omnibus account transactions, dividend transactions, capital gain transactions, and redemption transactions due to death of an account holder;
    determining for each of the financial transactions based on the comparison whether the financial transaction is an excluded internal transaction;
    responsive to a determination that the financial transaction is an excluded internal transaction, excluding the financial transaction from additional screening;
    responsive to a determination that the financial transaction is not an excluded internal transaction, adding the financial transaction to a dataset for an individual client that performed the financial transaction, thereby compiling, in the computer system, separate data sets for one or more individual clients from the financial transaction data, each data set comprising pertinent external financial transactions in the financial transaction data that are related to a respective individual client during a screening time interval;

comparing, in the computer system, for each of the data sets, external financial transactions for the respective individual client in the data set with at least one screening criterion, wherein said at least one screening criterion includes one of a criterion based on an aggregate monetary amount of all external financial transactions in a respective dataset, and an aggregate number of all external financial transactions within the screening time interval in the respective dataset; and determining, based on the comparison, whether the dataset for the respective individual client includes financial transactions that match the at least one screening criterion; and reporting, by the computer, each data set for each respective individual client that satisfies the at least one screening criterion.

7. The method of claim 6, wherein at least some of said data sets each include a plurality of financial transactions, and said plurality of financial transactions collectively relate to a plurality of accounts related to the respective individual client for said each data set.

8. The method of claim 6, wherein said aggregate monetary amount is modified from time to time.

9. The method of claim 6, further comprising:
excluding selected external financial transactions.

10. The method of claim 6, wherein said aggregate number of financial transactions is modified from time to time.

11. A computer system for detecting questionable financial transactions by individual clients, the computer system comprising:

a data source component configured to access a database of financial transaction data;

a data storage component, coupled to the data source component, and configured to store the financial transaction data;

an account compilation component, including a processor and coupled to the data storage component, and configured to:
receive financial transactions;
compare each of the financial transactions to a list of excluded internal transaction types, wherein the list includes systematic redemption transactions, dealer account transactions, omnibus account transactions, dividend transactions, capital gain transactions, and redemption transactions due to death of an account holder;
determine for each of the financial transactions based on the comparison whether the financial transaction is an excluded internal transaction;
responsive to a determination that the financial transaction is an excluded internal transaction, exclude the financial transaction from additional screening;
responsive to a determination that the financial transaction is not an excluded internal transaction, add the financial transaction to a dataset for the individual client that performed the financial transaction, thereby compiling separate data sets for one or more of the individual clients from the financial transaction data, each data set comprising financial transaction data related to a respective individual client during a screening time interval;

a screening component, including a processor and coupled to the account compilation component, and configured to:

compare, for each of the data sets, the financial transactions for the respective individual client in the data set with at least one screening criteria, wherein said at least one screening criteria includes one of a criterion based on an aggregate monetary amount of all external financial transactions in a respective dataset, and an aggregate number of all external financial transactions within the screening time interval in the respective dataset;

determine, based on the comparison, whether the dataset for the respective individual client includes questionable financial transactions that match the at least one screening criteria; and responsive to a determination that a data set matches the at least one screening criterion, adding the dataset to a monitoring report; and a reporting component, coupled to the screening component, and configured to report each data set for each respective individual client that satisfies the screening criteria; and wherein at least one of said screening criteria is modified from time to time.

12. The computer system of claim 11, wherein at least some of said data sets each include a plurality of financial transactions, and said plurality of financial transactions collectively relate to a plurality of accounts related to the respective individual client for said each data set.

13. A method of operating a computer system, the method comprising:

accessing a database of financial transaction data for one or more financial transactions from a data warehouse storage system;

storing the financial transactions in a screening system storage component;

comparing each of the financial transactions to a list of excluded internal transaction types, wherein the list includes systematic redemption transactions, dealer account transactions, omnibus account transactions, dividend transactions, capital gain transactions, and redemption transactions due to death of an account holder;

determining for each of the financial transactions based on the comparison whether the financial transaction is an excluded internal transaction;

responsive to a determination that the financial transaction is an excluded internal transaction, excluding the financial transaction from additional screening;

responsive to a determination that the financial transaction is not an excluded internal transaction, adding the financial transaction to a dataset for an individual client that performed the financial transaction, thereby compiling, in the computer system, separate data sets for one or more individual clients from the financial transaction data, each data set comprising financial transactions related to a respective individual client during a screening time interval, wherein the compilation excludes from the data sets one or more of: (a) systematic redemption transactions, (b) dealer account transactions, (c) omnibus account transactions, (d) dividend transactions, (e) capital gain transactions, and (f) redemption transactions due to death of an account holder ;

comparing, in the computer system, for each of the data sets, the financial transactions for the respective individual client in the data set with at least one screening criterion, wherein the screening criteria include at least one of (a) a criterion based on an aggregate amount of all financial transactions within a screening time interval in a respective data set, and (b) a criterion based on an aggregate number of all financial transactions within the screening time interval;

determining, based on the comparison, if the dataset for the respective individual client includes financial transactions that match the at least one screening criterion; and reporting, by the computer, each data set for each respective individual client that satisfies the screening criteria;

wherein the screening criteria include at least one of (a) a criterion based on an aggregate amount of all financial transactions within a screening time interval in a respective data set, and (b) a criterion based on an aggregate number of all financial transactions within the screening time interval in the respective data set; and wherein at least one of said screening criteria is modified from time to time.

14. The method of claim 13, wherein at least some of said data sets each include a plurality of financial transactions, and said plurality of financial transactions collectively relate to a plurality of accounts related to the respective individual client for said each data set.

* * * * *